United States Patent
Harding et al.

(10) Patent No.: US 10,213,357 B2
(45) Date of Patent: Feb. 26, 2019

(54) AMBULATORY EXOSKELETON AND METHOD OF RELOCATING EXOSKELETON

(71) Applicant: Ekso Bionics, Inc., Richmond, CA (US)

(72) Inventors: Nathan Harding, Oakland, CA (US); Adam Zoss, Berkeley, CA (US)

(73) Assignee: Ekso Bionics, Inc., Richmond, CA (US)

( * ) Notice: Subject to any disclaimer, the term of this patent is extended or adjusted under 35 U.S.C. 154(b) by 0 days.

(21) Appl. No.: 15/125,847

(22) PCT Filed: Mar. 19, 2015

(86) PCT No.: PCT/US2015/021467
§ 371 (c)(1),
(2) Date: Sep. 13, 2016

(87) PCT Pub. No.: WO2015/143157
PCT Pub. Date: Sep. 24, 2015

(65) Prior Publication Data
US 2017/0000682 A1 Jan. 5, 2017

Related U.S. Application Data

(60) Provisional application No. 61/968,664, filed on Mar. 21, 2014.

(51) Int. Cl.
*A61H 3/00* (2006.01)
*A61H 1/02* (2006.01)
*B62D 57/032* (2006.01)

(52) U.S. Cl.
CPC .............. *A61H 3/00* (2013.01); *A61H 1/024* (2013.01); *A61H 1/0244* (2013.01);
(Continued)

(58) Field of Classification Search
CPC ........ A61H 3/00; A61H 1/024; A61H 1/0244; A61H 1/0262; B62D 57/032
See application file for complete search history.

(56) References Cited

U.S. PATENT DOCUMENTS 4,697,808 A   10/1987 Larson et al.
5,020,790 A    6/1991 Beard et al.
(Continued)

FOREIGN PATENT DOCUMENTS

GB     2301776      12/1996
JP    2009095577     5/2009
(Continued)

*Primary Examiner* — LaToya M Louis
(74) *Attorney, Agent, or Firm* — Diederiks & Whitelaw, PLC

(57) ABSTRACT

An ambulatory exoskeleton can be selectively operated in at least two different modes, with one mode constituting an unworn propulsion mode, used when the exoskeleton is not worn by a user, and another mode constituting a default or worn propulsion mode, used when the exoskeleton is worn by a user. With this arrangement, a physical therapist, or other operator, wishing to move an unworn exoskeleton, can balance the unworn exoskeleton, while simultaneously utilizing a control system and actuators of the exoskeleton to propel the unworn exoskeleton. Therefore, the exoskeleton walks by taking steps forward, as commanded by the operator using any of a plurality of input arrangements, while the operator balances and steers the exoskeleton by physically guiding the exoskeleton using a handle or other interaction surface of the exoskeleton.

18 Claims, 5 Drawing Sheets

(52) U.S. Cl.
CPC ......... *A61H 1/0262* (2013.01); *B62D 57/032* (2013.01); *A61H 2201/165* (2013.01); *A61H 2201/1635* (2013.01); *A61H 2201/5023* (2013.01); *A61H 2201/5035* (2013.01)

(56) References Cited

U.S. PATENT DOCUMENTS

| | | | |
|---|---|---|---|
| 5,828,813 A * | 10/1998 | Ohm | B25J 3/04 |
| | | | 700/260 |
| 8,070,700 B2 | 12/2011 | Kazerooni et al. | |
| 8,079,433 B2 | 12/2011 | Teague et al. | |
| 8,579,838 B2 | 11/2013 | Jang et al. | |
| 8,690,802 B2 | 4/2014 | Sankai | |
| 2003/0093021 A1 * | 5/2003 | Goffer | A61F 5/0102 |
| | | | 602/23 |
| 2006/0206167 A1 * | 9/2006 | Flaherty | A61H 1/0255 |
| | | | 607/48 |
| 2011/0264014 A1 * | 10/2011 | Angold | B25J 9/0006 |
| | | | 601/35 |
| 2011/0313331 A1 * | 12/2011 | Dehez | A61H 1/0277 |
| | | | 601/33 |
| 2012/0068422 A1 * | 3/2012 | Kanaoka | B25J 9/0006 |
| | | | 280/1.181 |
| 2013/0158445 A1 * | 6/2013 | Kazerooni | A61H 3/00 |
| | | | 601/35 |
| 2013/0231595 A1 | 9/2013 | Zoss et al. | |
| 2013/0253385 A1 | 9/2013 | Goffer et al. | |
| 2013/0268120 A1 * | 10/2013 | Grygorowicz | B25J 1/02 |
| | | | 700/264 |
| 2014/0012164 A1 | 1/2014 | Tanaka | |
| 2014/0100493 A1 | 4/2014 | Craig et al. | |
| 2014/0142475 A1 | 5/2014 | Goldfarb et al. | |
| 2014/0188275 A1 * | 7/2014 | Lee | B25J 5/007 |
| | | | 700/257 |
| 2014/0188279 A1 * | 7/2014 | Lee | B25J 9/1607 |
| | | | 700/263 |

FOREIGN PATENT DOCUMENTS

| | | |
|---|---|---|
| WO | WO 2009/051574 | 4/2009 |
| WO | WO 2012/027336 | 3/2012 |
| WO | WO 2013/142777 | 9/2013 |
| WO | WO 2014/113456 | 7/2014 |

* cited by examiner

AMBULATORY EXOSKELETON AND METHOD OF RELOCATING EXOSKELETON

CROSS-REFERENCE TO RELATED APPLICATIONS

This application represents a National stage application of PCT/US202015/021467 entitled "Ambulatory Exoskeleton and Method of Relocating Exoskeleton" which claims the benefit of U.S. Provisional Patent Application Ser. No. 61/968,664, which was filed on Mar. 21, 2014 and titled "External Control and Balance of a Lower Extremity Orthotic Device for Transportation". The entire content of these applications are incorporated by reference.

BACKGROUND OF THE INVENTION

The present invention pertains to powered orthotic devices and, more particularly, to relocating powered orthotic devices when the devices are not being worn.

Orthotic systems, such as human exoskeletons, are being used to restore, rehabilitate, enhance and protect human muscle function. These exoskeletons are systems of actuated braces that apply forces to the appendages of an exoskeleton wearer or user. In a rehabilitation setting, exoskeletons are typically operated by a physical therapist who uses one or more of a plurality of possible input arrangements to sends commands to an exoskeleton control system. The exoskeleton control system receives intent commands from the exoskeleton operator (e.g., the physical therapist) and then performs desired actions accordingly. In order to properly execute these desired actions, the exoskeleton control system utilizes a range of sensors placed throughout the exoskeleton to sense the exoskeleton's state. Thereafter, the exoskeleton control system prescribes and controls trajectories in the joints of the exoskeleton. These trajectories can be prescribed as position based, force based or a combination of both methodologies, such as through an impedance controller.

During rehabilitation, although the trajectories of the actuated braces of the exoskeleton are controlled by the exoskeleton control system and commands from the physical therapist to the exoskeleton control system, the wearer of the exoskeleton makes significant contributions to the locomotion of the exoskeleton, particularly with regards to balancing both themselves and the exoskeleton, as well as to maneuvering and turning the exoskeleton. As such, exoskeletons are mostly ineffective or incapable of balancing or turning themselves when not worn by a person. In a number of situations, it is desirable for someone, such as a physical therapist, to move an exoskeleton that is not being worn, such as prior to or after a rehabilitation session. However, the substantial weight and size of the exoskeleton makes the lifting and carrying of the exoskeleton awkward and inconvenient for anyone to execute over even short distances. As the exoskeleton is a locomotive device, the capacity exists for the actuated braces of an unworn exoskeleton to assist in the movement of the exoskeleton. Therefore, it would be desirable to develop a device and method that allows a physical therapist, or other operator, to utilize the locomotive capabilities of an unworn exoskeleton in order to relocate the exoskeleton.

SUMMARY OF THE INVENTION

Disclosed herein are devices and methods that allow a physical therapist, or other operator, wishing to move an unworn exoskeleton, to provide for the balance of the unworn exoskeleton, while simultaneously utilizing a control system and actuated braces of the exoskeleton to propel the unworn exoskeleton. In other words, the exoskeleton walks by taking steps forward, as commanded by the operator using any of a plurality of input arrangements, while the operator balances and steers the exoskeleton by physically guiding the exoskeleton using a handle or other interaction surface of the exoskeleton.

In particular, the present invention is directed to an ambulatory exoskeleton and a method of relocating the ambulatory exoskeleton. The exoskeleton comprises a control system which can be selectively entered into or exited from an unworn propulsion mode to enable controlled movement of the exoskeleton in the unworn propulsion mode. The control system is configured to control the exoskeleton in at least two different modes, with one mode constituting the unworn propulsion mode, used when the exoskeleton is not worn by a user, and another mode constituting a worn propulsion or default mode, used when the exoskeleton is worn by a user.

Preferably, the control system controls the exoskeleton using a first set of parameters in the unworn propulsion mode and a second, different set of parameters in the default mode. The first set of parameters is optimized for use in controlling the exoskeleton when the exoskeleton is not worn by a user, and the second set of parameters is optimized for use in controlling the exoskeleton when the exoskeleton is worn by a user. In particular, each of the first and second sets of parameters includes safety parameters, with the safety parameters of the first set being relaxed relative to the safety parameters of the second set.

In one embodiment, the control system is caused to enter or exit the unworn propulsion mode through a button, switch or other activation member, the position of which is selectively determined by a physical therapist or other operator when the exoskeleton is not being worn. In one form of the invention, after entering the unworn propulsion mode, an activation portion of the control system then determines whether the exoskeleton is actually being worn by a user. In a particular embodiment, the determination of whether the exoskeleton is worn by a user is based on a measurement of a motor current required by an actuated brace of the exoskeleton in order for the exoskeleton to stand. In accordance with the invention, movement of the exoskeleton following entry into the unworn propulsion mode can be controlled in various ways. In one embodiment, once use of the exoskeleton in the unworn propulsion mode is established, the exoskeleton automatically takes a step forward. In another embodiment, movement in the unworn propulsion mode is established through a portion of the control system that determines an angle of a shank of the exoskeleton. For instance, when the angle of the shank reaches a predetermined value, the control system causes the exoskeleton to take a step forward. In yet another embodiment, the exoskeleton further comprises a handle, and the control system causes the exoskeleton to move based on a force applied to the handle.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
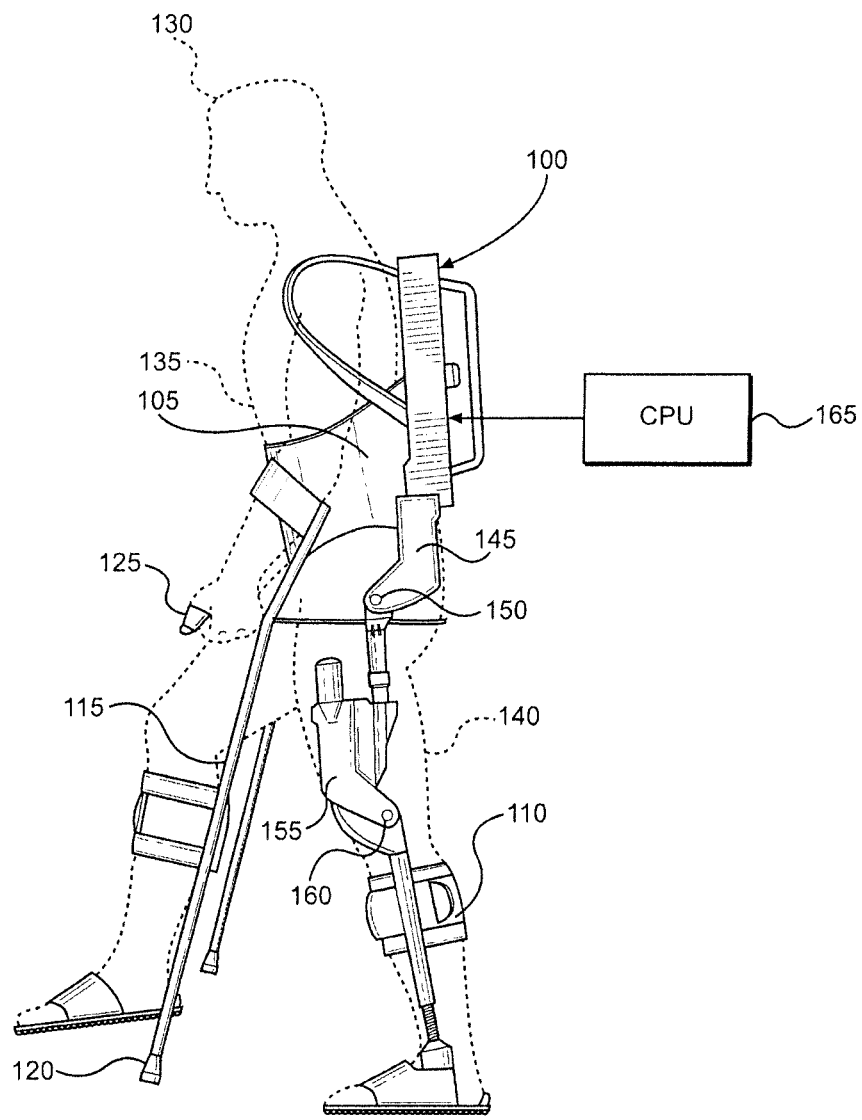
FIG. 1 is a side view of an exoskeleton and a wearer thereof in accordance with the present invention.

Concepts were developed to provide an operator with a way to activate, control, balance and direct the actuated walking movement of an unworn ambulatory exoskeleton (i.e., an exoskeleton not currently worn by a patient or other person). An exemplary ambulatory exoskeleton is illustrated in FIG. 1, with the exoskeleton shown being worn by a patient in a physical therapy setting. With continued reference to FIG. 1, an exoskeleton 100 has a torso portion 105 and leg supports (one of which is labeled 110). Exoskeleton 100 is used in combination with a pair of crutches, a left crutch 115 of which includes a lower, ground engaging tip 120 and a handle 125. In connection with this embodiment, through the use of exoskeleton 100, a patient (or, more generally, a wearer or user) 130 is able to walk. In a manner known in the art, torso portion 105 is configured to be coupled to a torso 135 of patient 130, while the leg supports are configured to be coupled to the lower limbs (one of which is labeled 140) of patient 130. Additionally, actuators, interposed between portions of the leg supports 110, as well as between the leg supports 110 and torso portion 105, are provided for shifting of the leg supports 110 relative to torso portion 105 to enable movement of the lower limbs 140 of patient 130. In some embodiments, torso portion 105 can be quite small and comprise a pelvic link (not shown), which wraps around the pelvis of patient 130. In the example shown in FIG. 1, the actuators are specifically shown as a hip actuator 145, which is used to move a hip joint 150 in flexion and extension, and as knee actuator 155, which is used to move a knee joint 160 in flexion and extension. The actuators 145 and 155 are controlled by a controller (or CPU) 165 in a plurality of ways known to one skilled in the art of exoskeleton control, with controller 165 being a constituent of an exoskeleton control system. Although not shown in FIG. 1, various sensors are in communication with controller 165 so that controller 165 can monitor the orientation of exoskeleton 100. Such sensors can include, without restriction, encoders, potentiometers, accelerometer and gyroscopes, for example. As certain particular structure of an exoskeleton for use in connection with the present invention can take various forms and is known in the art, it will not be detailed further herein.

Previously disclosed devices and methods have provided ways for a patient to balance or assist in the balance of an ambulatory exoskeleton worn by the patient. However, novel devices and methods are required for an unworn exoskeleton device to walk while being balanced and directed by a physical therapist or other operator. In order for the unworn exoskeleton to assist in its own propulsion while being balanced and directed by, for instance, a physical therapist, the exoskeleton control system is first signaled or commanded to enter an "unworn propulsion mode". The unworn propulsion mode is distinct from a default mode which is designated for when the exoskeleton is worn by a patient. In addition to facilitating relocating of the unworn exoskeleton by the physical therapist, the unworn propulsion mode is preferably optimized for the absence of a patient (i.e., the exoskeleton control system controls the exoskeleton according to different parameters). Once the exoskeleton is in the unworn propulsion mode, the actuated braces of the exoskeleton cause the exoskeleton to take steps, thereby resulting in a walking motion, with the step rate and timing controlled as described below, while the physical therapist assists in the balancing of the exoskeleton until the point at which the physical therapist commands the exoskeleton to cease walking. One can visualize such a device as being akin to a person walking a hand truck, where the person operating the device can control its motion almost effortlessly without bearing the weight of the device.

A first embodiment of the invention comprises an exoskeleton with a handle mounted on the back of the exoskeleton and an activation member, such as a button, toggle switch or the like, as an input means in proximity to the handle. The activation member is in communication with the exoskeleton control system and, upon signaling the exoskeleton control system through the activation member by a physical therapist, the exoskeleton control system enters the unworn propulsion mode. When the exoskeleton control system enters the unworn propulsion mode, the exoskeleton is balanced by the physical therapist using the handle, and the physical therapist is able to command the exoskeleton to take steps forward using control inputs. In one rather simple implementation, the exoskeleton automatically takes steps forward at a constant rate until the activation member is deselected by the physical therapist. In another embodiment, the physical therapist uses a control pad as an activation member to command each step. In a further embodiment, the exoskeleton makes use of sensed operational parameters of the exoskeleton in connection with controlling the exoskeleton. For instance, the shank angle of the forward leg in double stance is a consistent indicator of when the exoskeleton is prepared to take a step with the rear leg. Therefore, in one embodiment of the invention, when the leg support shank of the forward leg (during double stance) is leaned forward sufficiently, this parameter is used to indicate a desire to take a step and the powered orthotics controller initiates a step with the rear leg. Other operational parameters could also be employed, including those described in PCT Application No. PCT/US2013/033472, titled "Human Machine Interface for Lower Extremity Orthotics", which is hereby incorporated by reference. In some embodiments, the exoskeleton can also walk backwards when the angle of the rear shank decreases during double stance, in which case the forward leg enters a swing phase and takes a backwards step. This embodiment has utility when maneuvering the exoskeleton in tight spaces.

At this point it should be recognized that there are many ways to measure operational parameters of an exoskeleton, including the leg support shank angle with respect to the ground. For example, in addition to measuring the shank angle directly with an inertial measurement unit (IMU), in some embodiments it is possible to measure the torso orientation with an IMU and the relative angles at the hip and knee and use the combination of these measurements to produce a shank angle. In another example, if the terrain is generally known, it is possible to measure the ankle angle to estimate the shank angle. In yet other embodiments, it is sufficient to measure the general position of the torso relative to the foot, and multiple measurements are combined to estimate this relative orientation. Further, it is important to understand that this control system method is particularly advantageous in connection with the present invention because it allows the physical therapist to indirectly, but intuitively, control the walking speed of the exoskeleton. If the physical therapist pushes the torso of the exoskeleton forward, the device will pivot about the ankle, thereby increasing the shank angle and, upon reaching a predetermined shank angle, triggering the step. The faster the physical therapist pushes the exoskeleton torso forward, the sooner the shank angle will reach the threshold, the sooner the exoskeleton will take the next step and the faster the exoskeleton will walk. In some embodiments, the speed of the swing is tied to the rate that the exoskeleton steps are triggered (or the speed of the shank motion), such that the speed of the leg swinging forward can also be increased as the physical therapist pushes the exoskeleton to walk faster.

Figure 2:
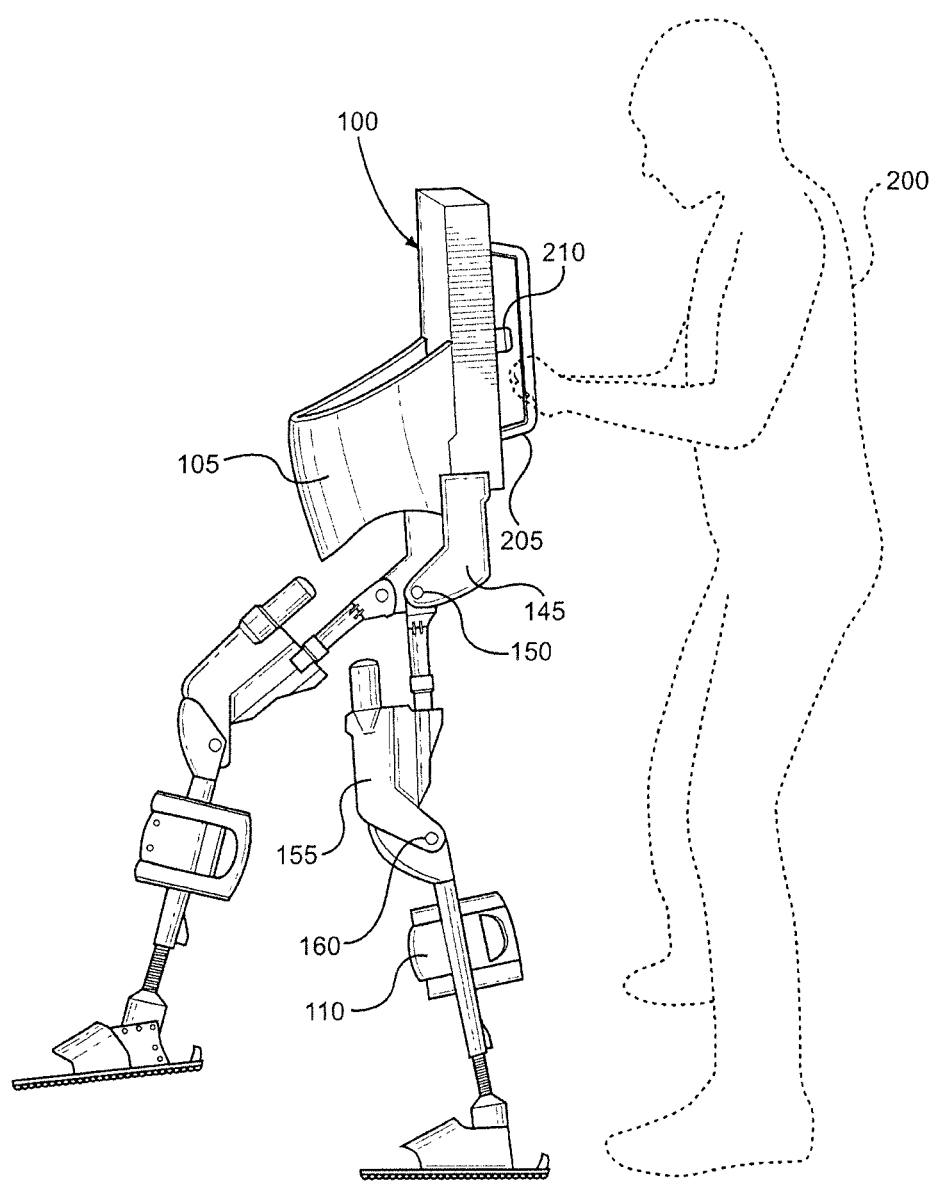
FIG. 2 is a side view of the exoskeleton with a physical therapist or other operator balancing and controlling the unworn exoskeleton as the exoskeleton steps forward.

A depiction of the first embodiment is shown in FIG. 2, in which a physical therapist 200 uses his hands to grasp a handle 205 that is attached to exoskeleton 100. The interaction of physical therapist 200 with handle 205 allows physical therapist 200 to exert force on exoskeleton 100 and thereby both guide and balance exoskeleton 100. When physical therapist 200 activates a button 210, exoskeleton 100 begins to take steps forward, which is shown in this case by a step in progress. During this stepping process, physical therapist 200 continues to balance exoskeleton 100 by exerting force on handle 205. Although a single handle is shown in FIG. 2, exoskeleton 100 can include multiple handles. Alternatively, handle 205 can be omitted, and physical therapist 200 can grasp other portions on the rear of exoskeleton 100, with such portions optionally being configured to facilitate grasping.

In other embodiments, the exoskeleton can estimate how hard the physical therapist is pushing on the handle, either with a force sensor in the handle, measuring the motion of the torso or measuring how much current is consumed in hip actuation, and use this information to choose when and how fast to take a step. It is important to note that some of these embodiments, such as monitoring the current in the hip actuation and measuring the motion of the torso, would not require any additional sensing beyond that which would already be required to operate the exoskeleton. As a result, these embodiments advantageously add only software to the device and would not increase the cost or complexity of the exoskeleton. In some embodiments, the exoskeleton can consider if the force applied by the physical therapist is directed to one side or the other and chose to take repeated steps on one leg in order to facilitate turning. In a further embodiment, the exoskeleton can estimate the vertical component of the force applied by the physical therapist and use this information to choose when to sit or stand (e.g., standing when the exoskeleton is sitting and the physical therapist pulls up on the handle or sitting when the exoskeleton is standing and the physical therapist pushes down on the handle). In yet another embodiment, the exoskeleton can monitor the roll angle of the torso and take multiple steps on the same side to facilitate turning when the torso is leaned to one side. In still another embodiment, the physical therapist can shake the torso, which results in the exoskeleton taking short, rapid steps in place to facilitate turning and maneuvering of the exoskeleton in tight quarters.

Figure 3:
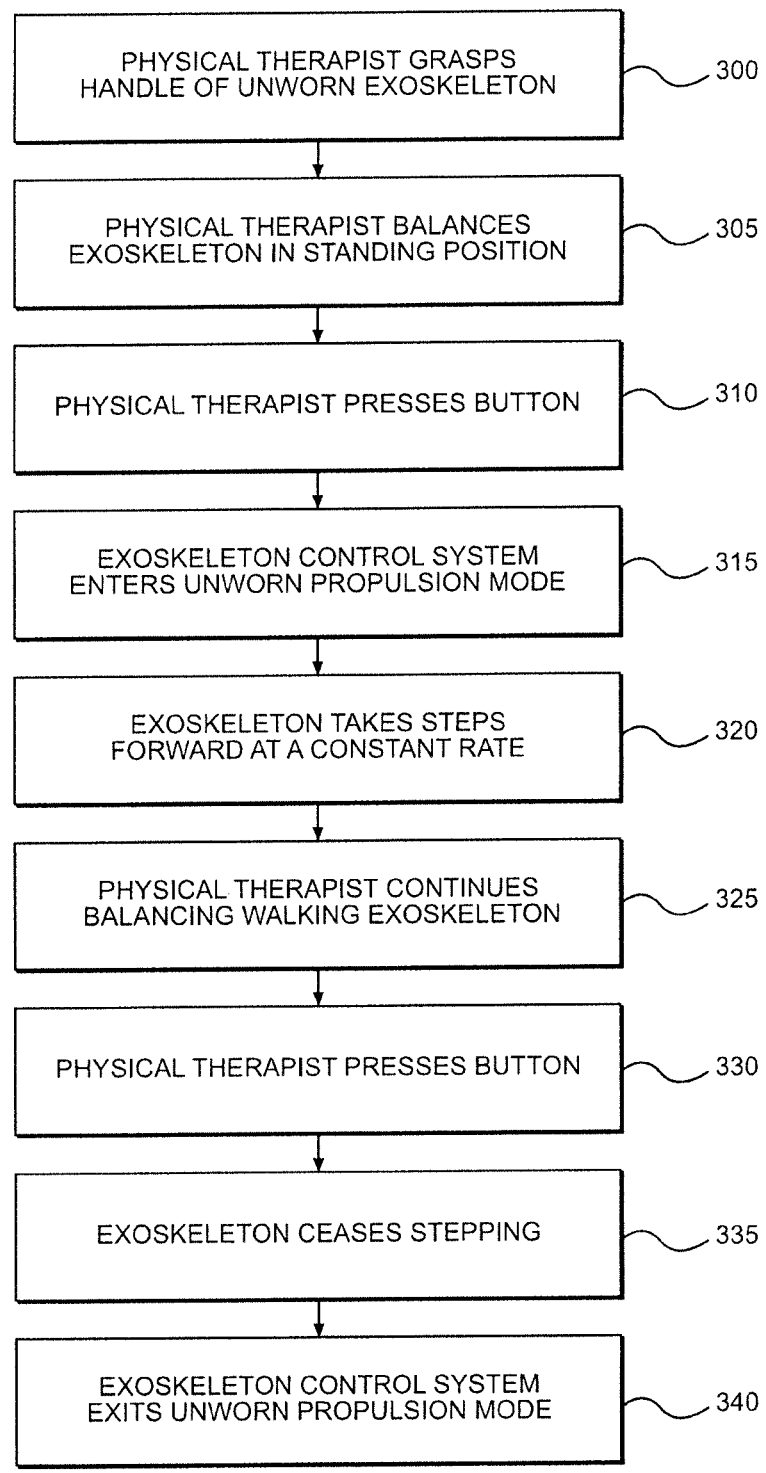
FIG. 3 is a flow diagram showing one embodiment of a process by which the exoskeleton enters an unworn propulsion mode, is relocated by a physical therapist and then exits the unworn propulsion mode.

A diagram illustrating the first embodiment is provided in FIG. 3. The physical therapist 200 grasps the handle 205 of the unworn exoskeleton 100 (step 300), and, by use of the handle 205, the physical therapist 200 balances the exoskeleton 100 into a standing position (step 305). At this point, the physical therapist 200 presses the button 210 (step 310), which causes the exoskeleton control system 165 to enter the unworn propulsion mode (step 315). As a result, the exoskeleton 100 takes steps forward at a constant rate (step 320), during which time the physical therapist 200 continues balancing the walking exoskeleton 100 (step 325) until such point that the physical therapist 200 again presses the button 210 (step 330). This causes the exoskeleton 100 to cease stepping (step 335) and signals the exoskeleton control system 165 to exit the unworn propulsion mode (step 340).

As an example of the first embodiment, consider a physical therapist working in a clinical setting with an exoskeleton. At the beginning of the day, prior to the arrival of patients, the physical therapist may wish to move the exoskeleton from a storage or battery charging area to a therapy area that is across a room or down a hall. When the physical therapist wishes to move the exoskeleton from one of these locations to the other, the physical therapist grasps a handle on the back of the exoskeleton and lifts or balances the exoskeleton into a position suitable for walking. The physical therapist then steers the exoskeleton device in the direction that the physical therapist wishes the exoskeleton device to walk and pushes the button on the exoskeleton that directs the exoskeleton control system to enter the unworn propulsion mode. As a result, the exoskeleton takes steps forward at a constant rate while being balanced by the physical therapist who steers the exoskeleton, as needed, until such time as the physical therapist wishes the exoskeleton to stop walking. At that point, the physical therapist again pushes the same button on the exoskeleton, which commands the exoskeleton to stop taking steps forward and to exit the unworn propulsion mode. The exoskeleton completes the last motion in progress (i.e., finishing any step being taken) and returns to a standing position. The physical therapist can repeat this process any number of times until satisfied with the final location of the exoskeleton.

Another exemplary embodiment of the invention comprises an exoskeleton with a handle mounted on the back of the exoskeleton and an activation member in the form of a control pad in communication with the exoskeleton control system. The control pad has a selectable option that, upon selection by a physical therapist, signals the exoskeleton control system to enter the unworn propulsion mode. When the exoskeleton control system enters the unworn propulsion mode, the exoskeleton is balanced by the physical therapist using the handle and the physical therapist is able to command the exoskeleton to take steps forward using the control pad to command each step. Optionally, the control pad can include additional controls for commanding the exoskeleton to turn, step backward, stand or sit, for example. Alternatively, as described above, the exoskeleton can be commanded to perform such actions based on the force applied to the handle (or other appropriate inputs) by the physical therapist.

As an example of this embodiment, again consider a physical therapist working in a clinical setting with an exoskeleton wherein the physical therapist wishes to move the exoskeleton from one area to another. Here, the physical therapist selects an option on the exoskeleton control pad that directs the exoskeleton control system to enter the unworn propulsion mode. As a result, the exoskeleton takes steps forward, as commanded by the physical therapist via the exoskeleton control pad, while being balanced by the physical therapist who steers the exoskeleton, such as through one or more handles as needed, until such time as the physical therapist wishes the exoskeleton to stop walking. At that point, the physical therapist selects an option on the exoskeleton control pad that commands the exoskeleton to stop taking steps forward and to exit the unworn propulsion mode. The exoskeleton then completes the last motion in progress (i.e., finishing any step being taken) and returns to a standing position. The physical therapist can repeat this process any number of times until satisfied with the final location of the exoskeleton.

A further aspect of the invention comprises an exoskeleton with a handle mounted on the back of the exoskeleton and an input means in communication with the exoskeleton control system, wherein the input means has a selectable option that, upon selection by a physical therapist, signals the exoskeleton control system to cause the exoskeleton to stand. Upon standing, the exoskeleton control system automatically measures the motor currents to the actuated braces required for the exoskeleton to stand. Based on these motor currents, the exoskeleton control system estimates the weight of the exoskeleton wearer. In the case of an unworn exoskeleton, the exoskeleton control system would estimate that the exoskeleton wearer weighs nothing, which indicates to the exoskeleton control system that the exoskeleton is unworn. Of course, there are many other ways known in the art to estimate the weight of the user (i.e., whether a user is present) that would also work in determining that the exoskeleton is unworn, such as force sensors in the feet or in appropriate links of the exoskeleton. In the case in which the exoskeleton control system has determined that the exoskeleton is unworn, the exoskeleton control system can be programmed to automatically enter into the unworn propulsion mode. When the exoskeleton control system enters the unworn exoskeleton propulsion mode, the exoskeleton is balanced by the physical therapist using the handle, and the physical therapist is able to command the exoskeleton to take steps forward using any of control means known to one skilled in the art, including the methods described in PCT Application No. PCT/US2013/033472 (referenced above).

Figure 4:
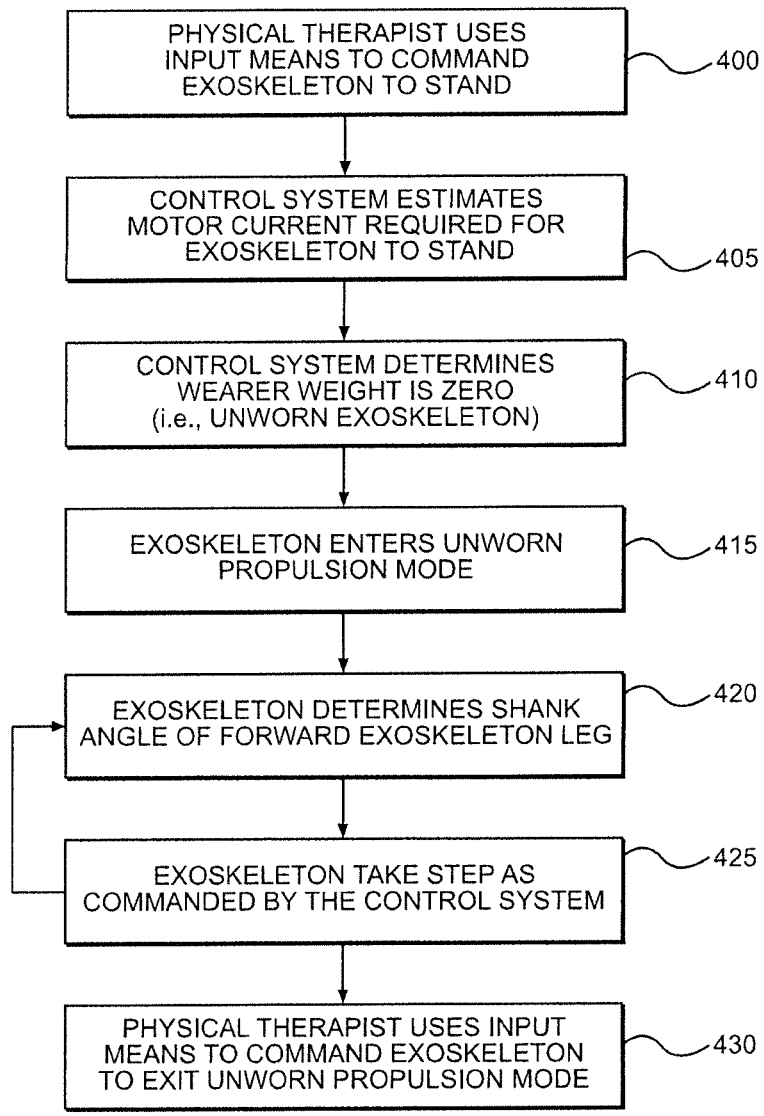
FIG. 4 is a flow diagram showing another embodiment of a process by which the exoskeleton enters the unworn propulsion mode, is relocated by a physical therapist and then exits the unworn propulsion mode.

A block diagram illustrating this embodiment is provided in FIG. 4. The physical therapist first commands the exoskeleton to stand using the input means (step 400), such as one or more force sensors as activation member(s) actuated when the physical therapist grasps a handle to balance the unworn exoskeleton. As the exoskeleton stands, the exoskeleton control system estimates the motor current required for the exoskeleton to stand (step 405), and the exoskeleton control system uses this motor current data to determine the weight of the exoskeleton wearer, which is zero in this example since the exoskeleton is unworn (step 410). Upon determining that the exoskeleton wearer weighs nothing and, therefore, that the exoskeleton is unworn, the exoskeleton automatically enters the unworn propulsion mode (step 415), at which point the exoskeleton measures the shank angle of the forward exoskeleton leg (step 420). When the forward leg reaches the correct shank angle, the exoskeleton control system commands the exoskeleton to take a step forward (step 425), while the physical therapist continues to use the handle to balance the exoskeleton. Walking of the exoskeleton then proceeds by a repetition of shank angle determination and step execution (i.e., steps 420 and 425). When the physical therapist stops pushing the torso of the exoskeleton, the exoskeleton will stop taking steps. To terminate the walking process, the physical therapist uses the input means to command the exoskeleton to exit the unworn propulsion mode (step 430), thereby preventing further steps.

As an example of this embodiment, consider a physical therapist working in a clinical setting with an exoskeleton. At the end of the workday, the physical therapist wishes to move the exoskeleton from a physical therapy room to a storage or battery charging area in another location. The physical therapist grasps a handle on the back of the exoskeleton and balances the exoskeleton while using an input means to command the exoskeleton to stand. The exoskeleton stands using force from the motors in the actuated exoskeleton joints while relying on the physical therapist for balance. Upon standing, the exoskeleton determines, based on joint currents, that it is unworn and enters into an unworn propulsion mode. The physical therapist steers the exoskeleton in the direction that the physical therapist wishes the exoskeleton device to walk and then shifts the balance of the exoskeleton slightly forward, resulting in a change in measured shank angle for the forward exoskeleton leg. When this shank angle reaches a particular point, the exoskeleton control system determines that a step should be executed and the exoskeleton takes a step forward. The physical therapist continues to balance the exoskeleton during execution and completion of the step. By using this process, the physical therapist can affect not only the balance of the unworn exoskeleton but also use the exoskeleton balance in controlling the exoskeleton to take steps forward in a walking process. The physical therapist uses these controls to command the exoskeleton to takes steps forward, with the exoskeleton walking while being balanced by the physical therapist who steers the exoskeleton, as needed, until such time as the physical therapist wishes the exoskeleton to stop walking. At that point, the physical therapist provides input to command the exoskeleton to stop taking steps forward and to exit the unworn propulsion mode. The exoskeleton then completes the last motion in progress (i.e., finishing any step being taken) and returns to a standing position. The physical therapist can repeat this process any number of times until satisfied with the final location of the exoskeleton.

Figure 5:
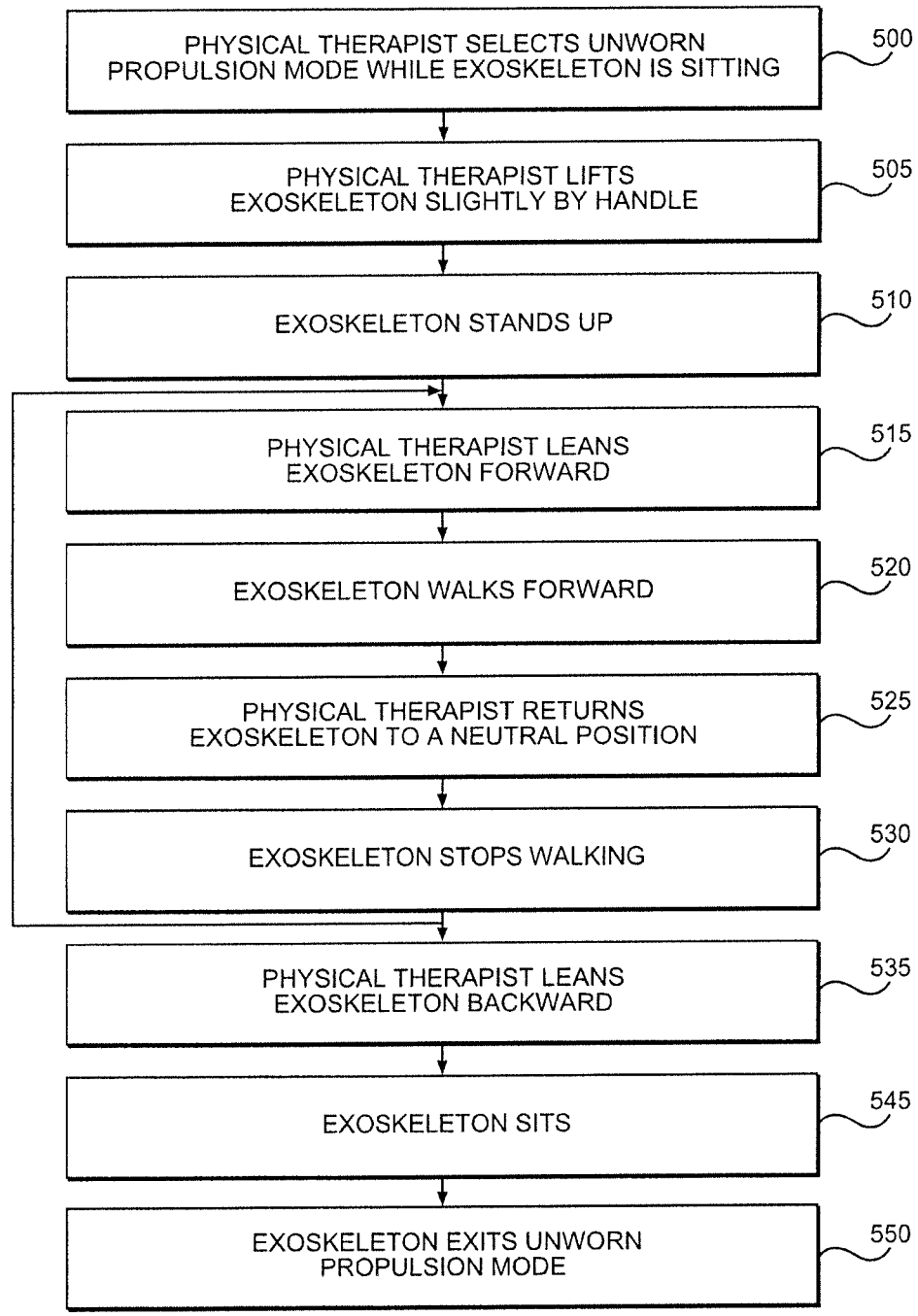
FIG. 5 is a flow diagram showing still another embodiment of a process by which the exoskeleton enters the unworn propulsion mode, is relocated by a physical therapist and then exits the unworn propulsion mode.

A block diagram illustrating a further embodiment is provided in FIG. 5. The physical therapist 200 selects the unworn propulsion mode of sitting exoskeleton 100 (step 500), and, by use of the handle 205, physical therapist 200 lifts exoskeleton 100 slightly (step 505). At this point, exoskeleton 100 detects the upward force and stands up (step 510). Then, physical therapist 200 pushes exoskeleton 100 forward (step 515). As a result, the exoskeleton 100 takes steps forward (step 520) until physical therapist 200 returns exoskeleton 100 to a neutral position (step 525), resulting in exoskeleton 100 corning to a stop (step 530). If the physical therapist 200 then pushes exoskeleton 100 forward (step 515), exoskeleton 100 begins stepping again (step 515). If, instead, the physical therapist 200 leans exoskeleton 100 backwards (step 535), then exoskeleton 100 sits (step 540) and exits the unworn propulsion mode (step 545).

In yet another embodiment, when an exoskeleton includes sufficient actuation, sensors and control to walk without assistance from a human, the exoskeleton can transport itself to a new location without need of physical interaction with a human. For example, a user can put the exoskeleton into the unworn propulsion mode and designate the location to which the exoskeleton should walk on a device such as a tablet computer or via a voice command. As a result, the exoskeleton will stand, walk to the specified location, sit and then exit the unworn propulsion mode. Optionally, the exoskeleton can wait for a command from the user before sitting and exiting the unworn propulsion mode. Of course, if the exoskeleton's storage position does not involve sitting, the standing and sitting steps can be omitted.

In general then, an exoskeleton in accordance with the present invention includes a control system; an input means for causing the control system to enter or exit an unworn propulsion mode; and a means for controlling movement of the exoskeleton in the unworn propulsion mode. As described above, the input means for causing the control system to enter or exit the unworn propulsion mode can be various different activation members, such as a button, switch or control pad, or an automatic determination that the exoskeleton is unworn. Additionally, the means for controlling movement of the exoskeleton in the unworn propulsion mode can be a manual input controller, such as a handle or control pad, or an automatic control, such as a determination of an angle of a shank of the exoskeleton. However, one skilled in the art should recognize that there are a variety of means by which an operator can cause the control system to enter or exit the unworn propulsion mode and control movement of the exoskeleton in this mode. For example, a joystick can be used to control the exoskeleton's movement, any employed buttons, switches or other activation members can be physical or digital. In addition, either means can be provided on a device separate from the exoskeleton (especially if the exoskeleton if able to balance itself without the aid of the operator).

In all embodiments, upon the exoskeleton control system entering the unworn propulsion mode, some of the parameters of the exoskeleton controlled by the exoskeleton control system are preferably changed or relaxed relative to the control parameters of an exoskeleton being worn by a person (i.e., when the exoskeleton control system is in the default mode). In the case of an unworn exoskeleton, it can be easier for the therapist to maneuver the exoskeleton upon relaxation of certain parameters. In addition, as an unworn exoskeleton is substantially lighter, easier for the physical therapist to maneuver and does not contain a patient, safety is of reduced concern such that certain safety related parameters can be relaxed (although the safety of the physical therapist should still be considered). For example, the coronal plane measurement discussed in PCT Application No. PCT/US2013/033472 (discussed above) would not need to be required to take a step.

Although the above embodiments have been discussed primarily in the environment of clinical rehabilitation, the present invention can equally well be applied to exoskeletons used in the home, where family members or caregivers may wish to maneuver an exoskeleton when it is not in use. Further, the present invention can be applied to exoskeletons used by able-bodied people to help such users maneuver their exoskeletons when they are not worn.

Based on the above, it should be readily apparent that the present invention provides a device and method that allows an operator to utilize the locomotive capabilities of an exoskeleton to relocate the exoskeleton when the exoskeleton is not being worn. Although described with reference to preferred embodiments, it should be readily understood that various changes or modifications could be made to the invention without departing from the spirit thereof. In general, the invention is only intended to be limited by the scope of the following claims.

The invention claimed is:

1. A method of relocating an ambulatory exoskeleton including a handle having a sensor and a control system configured to control the exoskeleton in at least two different modes, with one mode constituting an unworn propulsion mode, used when the exoskeleton is not worn by a user, and another mode constituting a default or worn propulsion mode, used when the exoskeleton is worn by a user, the method comprising:
   causing the control system to enter the unworn propulsion mode;
   controlling step movement of the exoskeleton in the unworn propulsion mode; and
   causing the control system to exit the unworn propulsion mode; and
   causing the exoskeleton to move, using the control system, based on a magnitude and a direction of a force applied to the handle by an operator as measured by the sensor, wherein the force applied determines when and how fast to take a step, and wherein, when the control system determines that the force is applied to only one side, the control system causes the exoskeleton to take repeated steps on one leg to facilitate turning.

2. The method of claim 1, further comprising:
   controlling the exoskeleton with the control system using a first set of parameters in the unworn propulsion mode; and
   controlling the exoskeleton with the control system using a second, different set of parameters in the default mode.

3. The method of claim 2, wherein the first and second sets of parameters include safety parameters, and wherein controlling the exoskeleton using the first set of parameters includes controlling the exoskeleton using safety parameters that are relaxed relative to the safety parameters of the second set of parameters.

4. The ambulatory exoskeleton of claim 1, further comprising: manually causing the control system to enter or exit the unworn propulsion mode through a manual activation member.

5. The method of claim 4, wherein causing the control system to enter or exit the unworn propulsion mode includes manually operating a button or switch.

6. The method of claim 1 wherein, when the control system enters the unworn propulsion mode, the exoskeleton automatically takes a step forward.

7. The method of claim 1, wherein controlling movement of the exoskeleton in the unworn propulsion mode includes determining an angle of a shank of the exoskeleton and causing the exoskeleton to take a step forward when the angle of the shank reaches a predetermined value.

8. The method of claim 1, wherein causing the control system to enter or exit the unworn propulsion mode includes employing the control system to automatically determine whether the exoskeleton is worn by a user.

9. The method of claim 8, wherein determining whether the exoskeleton is worn by a user includes measuring a motor current required by an actuated brace of the exoskeleton in order for the exoskeleton to move.

10. An ambulatory exoskeleton comprising:
a control system configured to control the exoskeleton in at least two different modes, with one mode constituting an unworn propulsion mode, used when the exoskeleton is not worn by a user, and another mode constituting a default or worn propulsion mode, used when the exoskeleton is worn by a user;
means for causing the control system to enter or exit the unworn propulsion mode; and
means for controlling movement of the exoskeleton in the unworn propulsion mode, wherein the means for controlling includes a handle having a sensor, wherein the control system causes the exoskeleton to move based on a magnitude and a direction of a force applied to the handle as measured by the sensor, wherein the force applied determines when and how fast to take a step, and wherein, when the control system determines that the force is applied to only one side, the control system causes the exoskeleton to take repeated steps on one leg to facilitate turning.

11. The ambulatory exoskeleton of claim 10, wherein the control system controls the exoskeleton using a first set of parameters in the unworn propulsion mode and using a second, different set of parameters in the default mode.

12. The ambulatory exoskeleton of claim 11, wherein the first and second sets of parameters include safety parameters, and wherein the safety parameters of the first set are relaxed relative to the safety parameters of the second set.

13. The ambulatory exoskeleton of claim 10, wherein the means for causing the control system to enter or exit the unworn propulsion mode is a manual activation member.

14. The ambulatory exoskeleton of claim 13, wherein the manual activation member is a button or switch.

15. The ambulatory exoskeleton of claim 10, wherein the means for causing the control system to enter or exit the unworn propulsion mode includes a portion of the control system that determines whether the exoskeleton is worn by a user.

16. The ambulatory exoskeleton of claim 15, wherein a determination of whether the exoskeleton is worn by a user is based on a measurement of a motor current required by an actuated brace of the exoskeleton in order for the exoskeleton to move.

17. The ambulatory exoskeleton of claim 10, wherein the means for controlling movement of the exoskeleton in the unworn propulsion mode causes, when activated, the exoskeleton to automatically take a step forward.

18. The ambulatory exoskeleton of claim 10, wherein the means for controlling movement of the exoskeleton in the unworn propulsion mode is a portion of the control system that determines an angle of a shank of the exoskeleton, and wherein, when the angle of the shank reaches a predetermined value, the control system causes the exoskeleton to take a step forward.

* * * * *